United States Patent [19]

Essle et al.

[11] Patent Number: 5,482,108
[45] Date of Patent: Jan. 9, 1996

[54] METHOD FOR REGENERATIVE HEAT EXCHANGER

[75] Inventors: Stefan Essle, Tyresö ; Bo Sångfors, Nacka, both of Sweden

[73] Assignee: Svenska Rotor Maskiner AB, Stockholm, Sweden

[21] Appl. No.: 244,478

[22] PCT Filed: Dec. 16, 1992

[86] PCT No.: PCT/SE92/00867

§ 371 Date: May 27, 1994

§ 102(e) Date: May 27, 1994

[87] PCT Pub. No.: WO93/12386

PCT Pub. Date: Jun. 24, 1993

[30] Foreign Application Priority Data

Dec. 17, 1991 [SE] Sweden ................................ 9103730

[51] Int. Cl.⁶ .................................................... F23L 15/02
[52] U.S. Cl. .................................. 165/3; 165/8; 261/89; 261/146; 261/153
[58] Field of Search .......................... 165/3, 8; 261/89, 261/146, 153

[56] References Cited

U.S. PATENT DOCUMENTS

| | | |
|---|---|---|
| 2,843,217 | 7/1958 | Von Linde ........................ 165/8 X |
| 3,148,665 | 9/1964 | Switzer, Jr. . |
| 4,287,938 | 9/1981 | Lagerquist et al. . |
| 4,452,180 | 6/1984 | Hassan . |
| 4,497,361 | 2/1985 | Hajicek ............................... 165/7 |
| 4,799,941 | 1/1989 | Westermark . |
| 4,909,190 | 3/1990 | Finch . |

FOREIGN PATENT DOCUMENTS

| | | | |
|---|---|---|---|
| 4107359 | 9/1992 | Germany ............................ 165/8 |
| 717782 | 3/1952 | United Kingdom . |

Primary Examiner—Allen J. Flanigan
Attorney, Agent, or Firm—Frishauf, Holtz, Goodman, Langer & Chick

[57] ABSTRACT

The invention relates to a method for achieving an optimal energy exchange in regenerative heat exchange between the combustion air and precooled, wet flue gases from a cooling device. By letting the moisture in said flue gases be condensed on the heat transfer surfaces the moisture will be transferred over to the air side where it is vaporized, resulting in some advantages, e.g. an increased energy exchange. According to the invention it has turned out to be possible to achieve a further increase of the energy exchange in a simple way by ensuring that the heat transfer surfaces of the flue gas side become really water-soaked when on the flue gas side, e.g. by letting the condensed water from the precooling device (15) drip or flow down onto the heat transfert surfaces such that said surfaces will remain wet during the entire passage through the combustion air side (10).

12 Claims, 1 Drawing Sheet

METHOD FOR REGENERATIVE HEAT EXCHANGER

BACKGROUND OF THE INVENTION

The present invention relates to a method for achieving an optimal energy exchange in regenerative heat exchange between the combustion air and precooled, wet flue gases from a cooling device.

When flue gases containing water vapour are cooled down to temperatures under their dew point, the water vapour can condense and the condensation heat be recovered. A further drop in temperature is possible by a regenerative heat exchange between the combustion air and the precooled, wet flue gases, further water vapour being condensed on the fume side and being vaporized on the combustion air side. As the combustion air simultaneously with being heated is wetted, an essential part of the energy can be transferred from the flue gases to the combustion air. The transferable energy amount, however, is limited by the fume side condensation being achieved during the regenerative heat exchange which does not sufficiently correspond to the combustion air side vaporization capability.

The invention has as an object in a simple way to achieve an optimal energy exchange for the method mentioned above.

SUMMARY OF THE INVENTION

According to the invention, this object is achieved in that the surfaces of a regenerative heat exchanger's heat exchanging elements on the flue gas are sprinkled with water in such a way that a water layer is formed on the heat exchanger element surfaces to such a degree that the element surfaces during their whole stay on the air side are substantially 100 percent covered with water. Without this water being added the heat transfer element surfaces dry up when passing the air side. The efficiency of this procedure in comparison with the method according to the invention appears from the following description of an example, according to which an increase of energy in the combustion air is achieved with 12.6 percent by the method of the present invention.

PREFERRED EMBODIMENT

According to a simple especially preferred development of the invention, the cooling device for the flue gas precooling is placed on top of the heat exchanger flue gas side, where the flue gases are led down into the heat exchanger in such a way that the condensation water formed in the cooling device can flow and/or drip down onto the heat exchanger elements. Consequently it is easy to achieve a temperature of the supplied water which is substantially equal to or somewhat higher than the flue gas temperature at the heat exchanger inlet which is of importance for the heat exchange.

DESCRIPTION OF THE DRAWINGS

The invention will be explained in detail in the following in connection with the attached drawing showing schematically as an example a heat exchanger with devices illustrating the method according to the invention, where.

Figure 1:
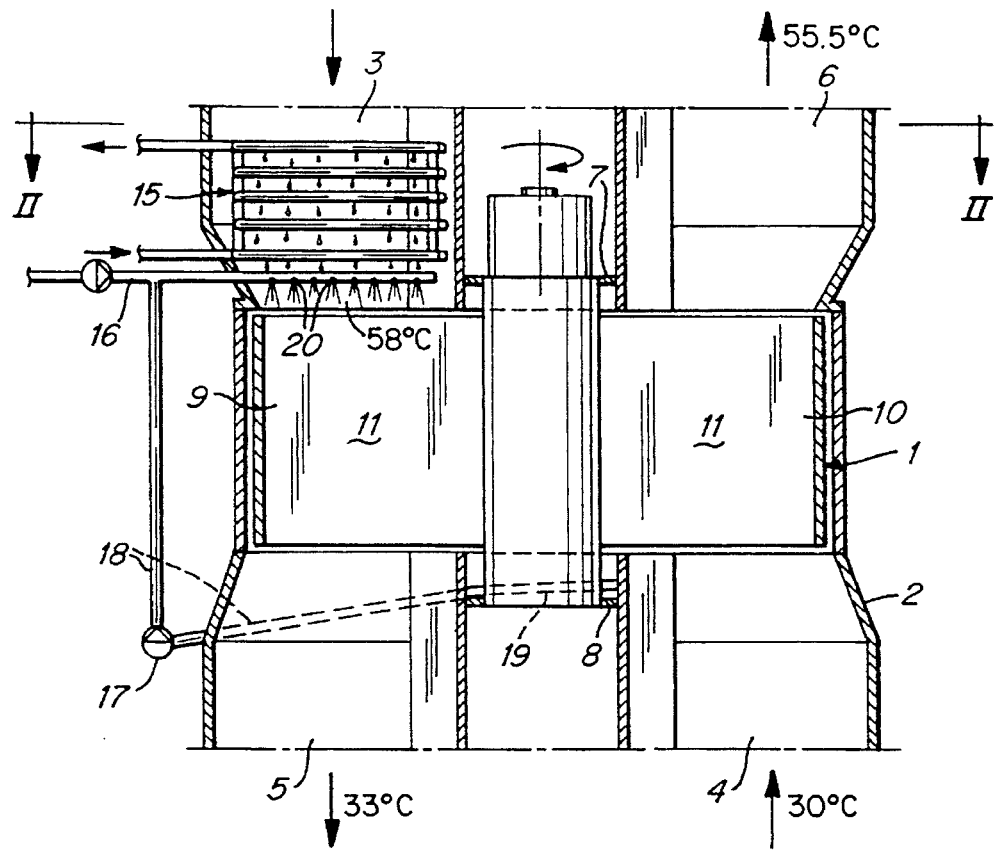
FIG. 1 is showing a longitudinal section along line 1—1 in FIG. 2 and FIG. 2 a cross section along line II—II in FIG. 1.
Figure 2:
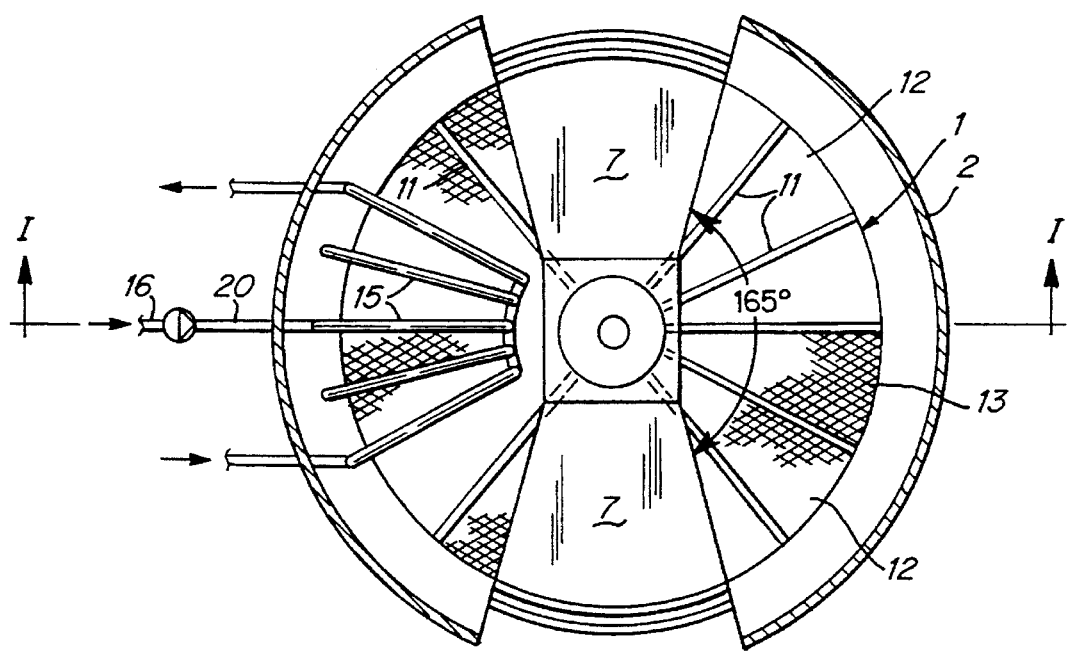

In the drawing a rotatable, regenerative heat exchanger already known in the art is shown comprising a rotor 1 rotatably supported in a casing 2 with inlet channels 3, 4 for gases and air, respectively, and outlet channels 5, 6 for gases and air, respectively, as well as upper and lower section plates 7 and 8, respectively, dividing the air preheater into a gas side and an air side 9 and 10, respectively, covering each 165 degrees of the total circumference.

The rotor 1 is provided with radial walls 11 dividing the rotor into a number of sections 12 being occupied by heat exchanger elements 13. These are air permeable in the air and the gas flow directions and consist of corrosion resistant material.

In the gas inlet channel 3 a cooler 15 is placed which is connected to e.g. a return water pipe for district heating and cools the flue gases down to a temperature under their water dew point. Thus, the water is condensed mid flows directly or by means of a trench down onto the heat exchanger elements 13 of the rotor 1, the surfaces of which are performing the condensation occurring directly on the element surfaces and are also being sprinkled with additional water before they are passing under the section plate 7 and proceeding to the air side 10, where the water again starts to evaporate. According to the invention, the water sprinkling of the elements 13 with condensing water is so abundant that the elements, after having passed the air side 10, are still wet. In cue the condensation and the water sprinkling should be insufficient for such an action, additional water must possibly be added which can be achieved from a water conduit 16 equipped with a valve and/or a return line 18 equipped with a pump 17 from a surplus water collection trench 19 in the lower section plate 8, with the line 18 being connected to sprinkling orifices 20 in the gas inlet channel 3.

By this optimal condensing and wetting on the flue gas side and reevaporization on the air side, substantially more energy can be transferred from the flue gases to the combustion air than previously has been obtainable.

For illustrating the effect of the method according to the invention, an example is described here below of such a method with and without addition of water to the heat exchanger elements, In the device shown in FIG. 1 the flue gas side is supplied with 101374 Nm³ flue gases per hour and 92952 Nm³ air per hour leaves the air side. Each side is comprises 165° of the total circumference, with the rotor rotating at a speed of 4 rpm. The supply air temprature is 30° C. The cooling device 15 is adjusted to cool the flue gases down to a temperature of 58° C., with the condensing water dripping or flowing down onto the heat exchanger elements 13 having essentially the same temperature. The additional condense water supply from the cooler 15 is sufficient to keep the elements 13 on the air side sufficiently wet. The temperature of the departing flue gases is then 33° C. and of the departing air 55.5° C.

The incoming gas moisture content is 0.1336 kg/kg dry gases and the departing gas moisture content is 0.0328 kg/kg dry gases. The corresponding values for the air are 0.0135 and 0.1192 kg/kg dry air, respectively. Thus, the energy supplied to the air is 9855 kWhrs.

If the cooler 15 is placed in such a way, that the condensing water emanating therefrom is not supplied to the elements 13, for example in accordance with SE-8703338-7, the elements 13 on the air side become dried up before they leave the airside. The temperature of the incoming gases remains still at 58° C. as well as the temperature of the incoming air at 30° C., Without any additional condensing water supply the departing gas temperature will be 33.8° C. and the departing air temperature 53.8° C.

The moisture content of the incoming gases as well as the moisture content of the incoming air remain unchanged 0.1336 kg/kg dry gases and 0.0135 kg/kg dry air, respectively. The moisture content of the departing gases will now be 0.0341 kg/kg dry gases and the moisture content of the leaving air 0.1071 kg/kg dry air. Thus, the energy supplied to the air side becomes 8756 kWhrs.

From the above it will be evident that the method according to the invention is transferring an energy which is 12.6 percent higher compared with a method without any additional water supply.

We claim:

1. A method for operating a heat exchanger to achieve optimal energy exchange for heat exchange in a regenerative heat exchange unit between combustion air and precooled wet flue gasess, which flue gasses were precooled in a cooling device (15), said regenerative heat exchange unit having a flue gas side (9), an air side (10) and regenerative heat exchanger heat transferring elements (13) which are rotated from the flue gas side (9) to and through the air side (10) and then return to the flue gas side (9), the method comprising:

sprinkling water on surfaces of the heat transferring elements (13) on the flue gas side (9) so that a water film is formed on the surfaces of the heat transferring elements (13) to such an extent that said heat transferring element surfaces are sufficiently wet so that during their entire stay on the air side (10), while being rotated through the air side (10), said heat transferring element surfaces are substantially 100% covered with water.

2. The method according to claim 1, wherein:

water condenses in said cooling device (15) when said wet flue gasses are precooled in said cooling device (15);

said cooling device (15) is positioned above the flue gas side (9) of the regenerative heat exchange unit, the flue gasses passing from the cooling device (15) down into the regenerative heat exchange unit; and said water which has condensed in said cooling device (15) falls down onto the heat transferring elements (13).

3. The method according to claim 2, wherein said condensed water flows down onto the heat transferring elements (13).

4. The method according to claim 2, wherein said condensed water drips down onto the heat transferring elements (13).

5. The method according to claim 1, wherein said water which is sprinkled on the surfaces of the heat transferring elements (13) is at a temperature substantially the same as a temperature of the flue gas at an inlet of a supply channel (3) to the cooling device (15).

6. The method according to claim 1, wherein said water which is sprinkled on the surfaces of the heat transferring elements (13) is at a temperature higher than a temperature of the flue gas at an inlet of a supply channel (3) to the cooling device (15).

7. The method according to claim 2, wherein said water which is sprinkled on the surfaces of the heat transferring elements (13) is at a temperature substantially the same as a temperature of the flue gas at an inlet of a supply channel (3) to the cooling device (15).

8. The method according to claim 2, wherein said water which is sprinkled on the surfaces of the heat transferring elements (13) is at a temperature higher than a temperature of the flue gas at an inlet of a supply channel (3) to the cooling device (15).

9. The method according to claim 3, wherein said water which is sprinkled on the surfaces of the heat transferring elements (13) is at a temperature substantially the same as a temperature of the flue gas at an inlet of a supply channel (3) to the cooling device (15).

10. The method according to claim 3, wherein said water which is sprinkled on the surfaces of the heat transferring elements (13) is at a temperature higher than a temperature of the flue gas at an inlet of a supply channel (3) to the cooling device (15).

11. The method according to claim 4, wherein said water which is sprinkled on the surfaces of the heat transferring elements (13) is at a temperature substantially the same as a temperature of the flue gas at an inlet of a supply channel (3) to the cooling device (15).

12. The method according to claim 4, wherein said water which is sprinkled on the surfaces of the heat transferring elements (13) is at a temperature higher than a temperature of the flue gas at an inlet of a supply channel (3) to the cooling device (15).

* * * * *